INVENTOR
THEODORE H. BONN
BY
ATTORNEY

INVENTOR

THEODORE H. BONN

BY [signature]

ATTORNEY

Oct. 13, 1964 T. H. BONN 3,153,150
MAGNETIC AMPLIFIER CIRCUIT HAVING
A PLURALITY OF CONTROL INPUTS
Filed Oct. 29, 1954 7 Sheets-Sheet 3

INVENTOR
THEODORE H. BONN
BY [signature]
ATTORNEY

INVENTOR

THEODORE H. BONN

BY

Edgar ... Light (signature)

ATTORNEY

Oct. 13, 1964

T. H. BONN

MAGNETIC AMPLIFIER CIRCUIT HAVING A PLURALITY OF CONTROL INPUTS 3,153,150

Filed Oct. 29, 1954

7 Sheets-Sheet 5

INVENTOR

THEODORE H. BONN

BY [signature]

ATTORNEY

INVENTOR
THEODORE H. BONN
BY [signature]
ATTORNEY

INVENTOR
THEODORE H. BONN
BY
ATTORNEY

United States Patent Office 3,153,150
Patented Oct. 13, 1964

3,153,150

MAGNETIC AMPLIFIER CIRCUIT HAVING A PLURALITY OF CONTROL INPUTS

Theodore H. Bonn, Philadelphia, Pa., assignor to Sperry Rand Corporation, a corporation of Delaware Filed Oct. 29, 1954, Ser. No. 465,624
34 Claims. (Cl. 307—88)

This invention relates to magnetic amplifier circuits employing a plurality of control inputs and especially such circuits in which a given number of the inputs must be in a predetermined condition in order to give a predetermined output condition. In addition, devices embodying the invention are peculiarly adapted for use in computing or data translating systems.

Heretofore, gating and control circuits have employed diodes as the main circuit components thereof, but diodes are likely to fail and it is desirable to reduce the number of them required as far as possible. It is an object to reduce the number of diodes required in circuits of the type here involved and to replace some of the diodes with more reliable control devices.

The principal object of the invention is to provide a gating circuit which responds only in event a predetermined number of input signals occur simultaneously to raise the device to a given threshold before giving an output, the principal parts of the device being magnetic amplifiers so that it may be readily adapted for use in computer circuits in which the remaining components are magnetic amplifiers.

Another object of the invention is to provide a gating system that is low in cost.

An additional object of the invention is to provide a gating system in which any given number of a plurality of control inputs may be energized to produce a predetermined output.

Another object of the invention is to provide a gating circuit that is very efficient and effective in operation.

Other and more detailed objects and advantages of the invention will be apparent as this description proceeds.

The present invention utilizes magnetic amplifiers with their control inputs so connected that a given number of control inputs must have a predetermined condition before the device produces a given output signal.

In some computer and data translating systems it is desirable that the control inputs respond to appearance of pulses on input circuits, and in other computer circuits it is desirable that the device respond to the absence of pulses on the input circuits. The present application shows how the gating circuits described may be used in either of these ways. Moreover, it is sometimes desirable that in response to predetermined input conditions there be a pulse or a series of pulses at the output, whereas in other circuits it is desirable that the same predetermined input condition produce the absence of pulses at the output. This application teaches how either of these situations may be met.

Any of the hereinbelow described circuits may act as a magnetic gate or a magnetic buffer, depending on its use in the computer or data translating circuit. Consequently, to avoid repetition the devices will hereinafter be referred to as magnetic gates. A gate is usually defined as a device wherein there is a signal output at the load only where there are predetermined inputs at all of the signal sources of the device. For example, if all the signal sources had signals thereon occurring concurrently and if this produced an output at the load, the device would be acting as a gate. The device would be acting as a buffer if a signal (or the lack of a signal) at any one of the signal inputs appears at one of the output connections in complemented or non-complemented form, without appearing at any other signal input. By suitable connections to the circuit, the devices hereinafter described may act as either a gate or a buffer, and to avoid complexity of the description, will be referred to as gating systems.

Early computing systems involved use of a large number of vacuum tubes. Later there have been developed computing systems involving numerous magnetic amplifiers of the general types hereinafter described in conjunction with FIGURES 1 and 12. A large number of these magnetic amplifiers are interconnected with each other and with other circuit components to constitute the computing system. The present application discloses magnetic gates that may be used in the computers that employ magnetic amplifiers; but their main application is in conjunction with a new and radically improved computing or data translating system involving large numbers of these gates interconnected with each other (or with gates shown in my copending applications hereinafter mentioned) and with other important components of the whole system. The present application has illustrations showing how the gates described therein may be interconnected. An example of interconnected gates is a half-adder herein fully disclosed.

Figure 2:
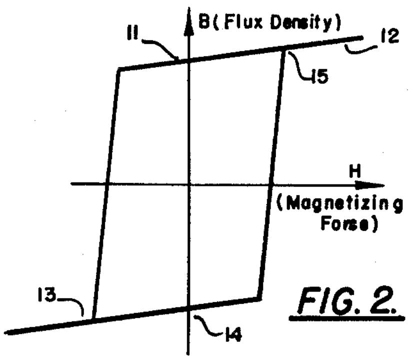
FIGURE 2 is an idealized hysteresis loop for core material of the magnetic amplifiers.

In all forms of the magnetic amplifiers hereinafter shown, the magnetic core may be made of a variety of materials among which are the various types of ferrites and the various magnetic tapes, including Orthonik and 4–79 Moly-Permalloy. These materials may have different heat treatments to give them different properties. The magnetic material employed in the core should preferably, though not necessarily, have a substantially rectangular hysteresis loop (as shown in FIGURE 2). Cores of this character are not well known in the art. In addition to the wide variety of materials available, the core may be constructed in a number of geometries including both closed and open paths; for example, cup-shaped, strips and toroidal-shaped cores are possible. Those skilled in the art understand that when the core is operating on the horizontal (or substantially saturated) portions of the hysteresis loop, the core is generally similar in operation to an air core in that the coil on the core is of low impedance. On the other hand, when the core is operating on the vertical (or unsaturated) portions of the hysteresis loop, the impedance of the coil on the core will be high.

In order to furnish background information useful in connection with understanding the invention, a brief description of one type of magnetic amplifier will now be given. For further details on this and other types of magnetic amplifiers, reference is made to the following two applications: Theodore H. Bonn and Robert D. Torrey, Serial No. 402,858, filed January 8, 1954, entitled "Signal Translating Device"; now U.S. Patent No. 3,071,694; John Presper Eckert, Jr. and Theodore H. Bonn, Serial No. 382,180, filed September 24, 1953, entitled "Signal Translating Device," now U.S. Patent No. 2,892,998. These applications have been assigned to the same assignee as the present application.

Figure 1:
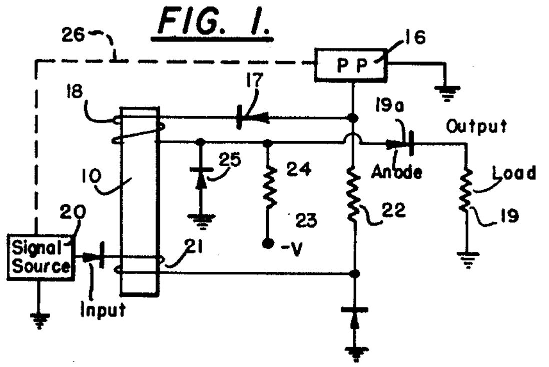
FIGURE 1 is a schematic diagram of a magnetic amplifier circuit, which is not part of the present invention but is employed in connection with the invention.

FIGURE 1 illustrates a complementing magnetic amplifier which is described to provide background information. In that figure, the source 16 of power pulses PP generates a train of equally spaced square wave positive and negative going pulses having spaces therebetween substantially equal to the duration of the pulses. If it be assumed that at the beginning of any given positive going pulse the core has residual magnetism and flux density as represented by point 11 of the hysteresis loop of FIGURE 2, the next positive power pulse will drive the core from point 11 to point 12, which represents saturation. At the conclusion of the positive going power pulse the magnetizing force will return to point 11. Successive pulses from power source 16 will flow through rectifier 17, coil 18 and load 19, repeatedly driving the core from point 11 to point 12. During the interval in which the core is being driven from 11 to 12, the core is operating on a relatively saturated portion thereof, whereby the impedance of coil 18 is low. Hence, positive power pulses will flow from source 16 to load 19 without substantial impedance. If during the interval between the positive excursions of two of the power pulses, a pulse is produced at the input source 20, it may pass through coil 21, resistor 22, source 16, to ground. This will magnetize the core negatively driving it from point 11 to point 13. At the conclusion of this negative pulse the core will return to point 14 where the magnetizing force is zero. The next positive power pulse from source 16 is just sufficient to drive the core from point 14 to point 15. Since this is a relatively unsaturated portion of the core, the coil 18 will have high impedance during this pulse and the current flow will be very low. At the conclusion of that positive pulse the magnetization will return to zero value 11. If no signal appears on the input immediately following the last-named positive power pulse, the next positive power pulse will drive the core to saturation at point 12 and will give a large output at the load 19.

Consequently, it is clear that the magnetic amplifier of FIGURE 1 will feed large positive pulses to the load in response to each positive pulse from source 16, except that immediately after the receipt of any pulse on the input 20 the next positive power pulse will be blocked.

In order to avoid appearance at the load 19 of the small so-called "sneak" current which flows during the period that a positive power pulse is driving the core from point 14 to point 15, the negative source 23, resistor 24 and rectifier 25 may be employed. Sufficient current flows through rectifier 25, resistor 24 and source 23 that the small "sneak" current from coil 18 to output 19 is cancelled.

Figures 3, 4:
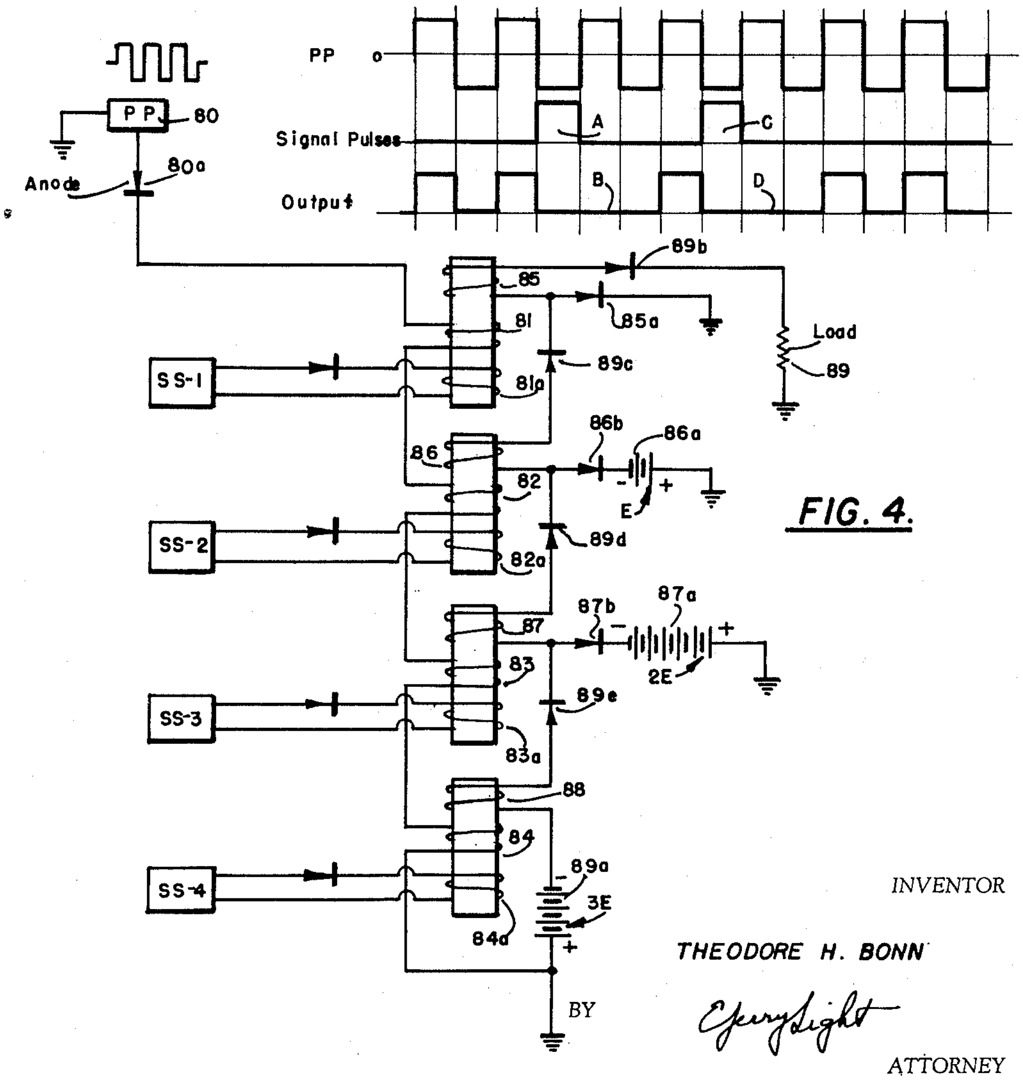
FIGURE 3 illustrates the waveforms of the signal involved in FIGURE 1.
FIGURE 4 is a schematic diagram of one of the gating circuits embodying the invention.

In one form of the device, coil 18 has twice the number of turns as coil 21 and the source 16 has twice the electrical potential as the pulses on input 20. The source 16 of positive power pulses, and the signal source 20 are so synchronized by any suitable means 26, that the signal pulses always occur during the spaces between positive power pulses. As shown in FIGURE 3, the signal pulses A and C, as do all other signal pulses, occur at times when the positive power pulses PP are at negative values. It follows from the foregoing description of FIGURE 1 that there will be a continuous train of power pulses in the output except during those intervals B and D which immediately follow the signal pulses A and C.

In some of the magnetic amplifiers hereinafter described, the means 23, 24 and 25 for suppressing the "sneak" currents has been omitted from the drawings and description, but could be added if desired.

The output of source 16 is an alternating current and goes negative during the space between positive power pulses. The negative pulse more than cancels any potential induced in coil 18 due to signal currents flowing through primary 21. As a result the negative excursions of source 16 render the anode of rectifier 17 negative and cut off that rectifier.

The device of FIGURE 1, just described, per se is not part of the invention. It has been described primarily as background information and secondarily since the circuit of FIGURE 1 is incorporated as a component part of some of the more complex circuits hereinafter described. The device of FIGURE 4, now to be described embodies a basic and important concept and constitutes one form of the invention.

FIGURE 4 is a gating circuit in which simultaneous signals on all of sources SS–1 to SS–4 inclusive are necessary in order for there to be an output across load 89. These signal sources would normally be components of a computer system such as for example output circuits of a magnetic store. The four signal sources SS–1 to SS–4 normally supply their control pulses during the spaces between the positive pulses of source 80. The details of the signal sources form no part of the invention, in its broadest aspects, and therefore the sources are shown in block form in FIGURE 4. However, in connection with FIGURE 5, the signal sources are explained in more detail. The source 80, of square wave alternating current power pulses, feeds primary windings 81, 82, 83 and 84 which induce current in output windings 85, 86, 87 and 88 when the cores are operating on the vertical portions of their hysteresis loops. In the event any one of the cores is saturated at the beginning of any given positive power pulse, it will not induce substantial potential in its complementary output winding, and then the total potential appearing across output coils 85 to 88 inclusive will be insufficient to overcome the bias of battery 89*a*. In other words, battery 89*a* supplies such negative potential that all (or a given number) of the output windings 85, 86, 87 and 88 must have maximum output potential in order to overcome bias of the battery 89*a* and cause a current to flow in the load 89. The selectively applied pulses from the signal sources SS-1 to SS-4 inclusive tend to magnetize their respective cores negatively from point 11 to point 13 on the hysteresis loop of FIGURE 2 during the period when the potential of source 80 goes negative. If all of them have produced a signal pulse simultaneously, the next positive power pulse from source 80 will drive the four cores from point 14 to point 15 along the vertical portion of the hysteresis loop and maximum potential will be induced in all four output coils 85 to 88 inclusive. The potential will then be sufficient to overcome the negative bias of the battery 89*a* and produce current at the load 89. If, however, there is no signal from one of the signal sources, for example SS-1, the core corresponding to that source will remain at point 11 on the hysteresis loop. The next power pulse from source 80 will then drive that core along the relatively saturated portion 11–12 of its hysteresis loop inducing very little potential into the output winding 85. Hence, the total potential of the four coils 85 to 88 inclusive will be insufficient to overcome the bias of the battery 89*a* and produce an output at the load 89. If desired, limiter circuits comprising elements 85*a*, 86*a*, 86*b*, 87*a* and 87*b* may be added to the respective stages in order to insure that none of them supply more than their proper share of the total potential to the circuit. Rectifier 85*a* is grounded, which means that the total potential of coils 86, 87 and 88 can never exceed the bias of the battery 89*a*. The lower end of coil 86 is clamped to a negative potential E while the lower end of coil 87 is clamped to a negative potential 2E. The lower end of coil 88 is connected to the battery 89*a* which has a negative potential of 3E. The limiter circuits, therefore, prevent any one of the coils 85 to 88 inclusive from supplying abnormally high potential to the series circuit. Potential induced in coil 88, due to a positive pulse from source 80 flowing through coil 84 when the core is unsaturated, has a polarity that opposes that of battery 89*a*. Hence, if such potential induced in coil 88 tends to exceed E volts the potential at the lower end of coil 87 will tend to be more positive than the negative pole of battery 87*a* (whose potential is 2E) and current will flow through rectifier 87*b*, battery 87*a* to ground thereby limiting the potential at the upper end of coil 88 to −2E volts. Similarly, if the potential induced in coil 87 tends to exceed E volts, current will flow through rectifier 86*b* until the potential across coil 87 is limited to E volts.

Rectifier 80*a* prevents negative pulses from source 80 from flowing through coils 81 to 84. When the potential of source 80 goes negative so that the anode of rectifier 80*a* is negative, the rectifier is cut off and will prevent any potentials that may be induced in coils 81 to 84, by reason of currents fed by sources SS-1 to SS-4 to coils 81*a* to 84*a* from having a closed circuit through which current may flow.

Rectifiers 89*b*, 89*c*, 89*d* and 89*e* preclude any potentials induced in coils 85 to 88 inclusive, by reason of currents fed by sources SS-1 to SS-4 to coils 81*a* to 84*a* from having a closed circuit through which current may flow.

FIGURE 4 shows the signal sources SS-1 to SS-4 inclusive with some generality for the reason that their exact details form no part of the invention. The only important thing in connection with these signal sources is that they are parts of a computer circuit which from time to time supply the necessary control pulses, timed to appear during the spaces between the positive pulses of source 80.

Figure 5:
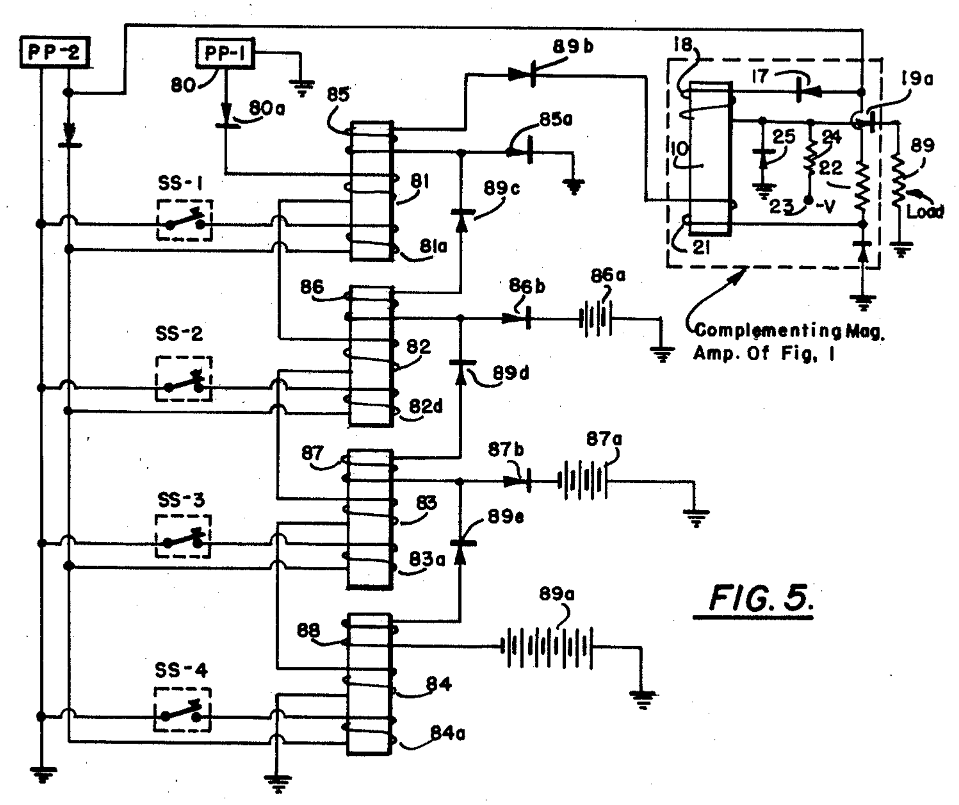
FIGURE 5 is a modified form of FIGURE 4.
Figures 7, 8, 9:
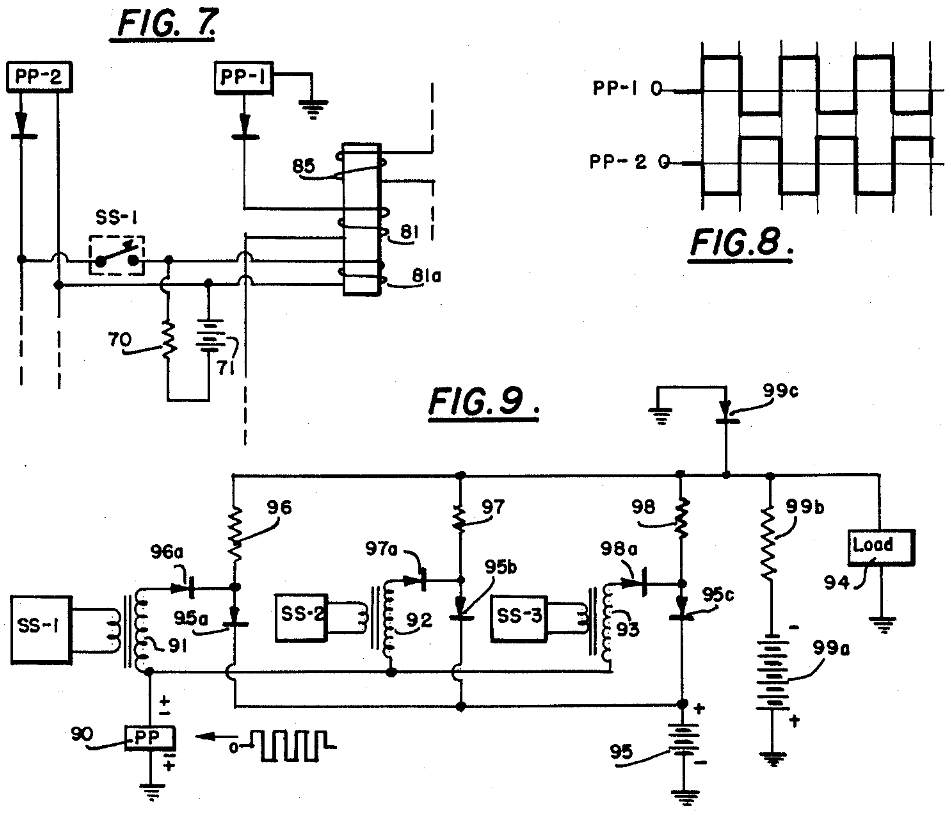
FIGURE 7 is a partial view of another modified form of FIGURE 4.
FIGURE 8 is a waveform diagram for the pulses involved in FIGURES 5, 6 and 7.
FIGURE 9 is a schematic diagram of a gating system in which the output has a negative bias which is overcome when all or a plurality of magnetic amplifiers have signals at their inputs occurring concurrently.

FIGURE 5 shows in a little more detail one way of securing the necessary timing. In FIGURE 5, there are two sources of power pulses PP-1 and PP-2. The pulses of source PP-2 go negative when the sources of PP-1 go positive, all as shown in FIGURE 8, therefore source PP-2 is capable of supplying control pulses during the spaces between positive pulses of source PP-1. Signal sources (which in this case are switches) SS-1 to SS-4 inclusive are respectively in series with coils 81*a* to 84*a* inclusive. Hence, in event any one of these switches is closed, its complementary coil, for example coil 81*a* in the case of switch SS-1, is energized during the spaces between positive power pulses of source 80. It is understood that in a computer circuit the switches SS-1 to SS-4 inclusive could be any component of the computer circuit which in effect closes the circuit to allow pulses from source PP-2 to flow to coil 81*a* and the switches are shown in their most elementary form only for purposes of illustration.

Another modification of FIGURE 4 is also shown in FIGURE 5, namely a complementing magnetic amplifier of the type shown in FIGURE 1 is connected in series with the load 89. This is optional and may be employed in the event it is desired to reverse the output at the load. As stated in connection with FIGURE 4, simultaneous signals on all of signal sources SS-1 to SS-4 inclusive are necessary in order for there to be an output across load 89. In FIGURE 5, if the complementing magnetic amplifier is used in the load circuit, the closing of all the switches SS-1 to SS-4 inclusive would cause a pulse to appear at the input coil 21 of the complementing magnetic amplifier, but inasmuch as a complementing magnetic amplifier produces no output during a time period immediately following an input pulse, it is apparent that there will be no output at load 89 of FIGURE 5 in event all four switches SS-1 to SS-4 inclusive of FIGURE 5 are closed.

Likewise, in event one (or more) of switches SS-1 to SS-4 of FIGURE 4 is open, there will be no output at the load 89. However, in connection with FIGURE 5, this same situation would produce an output pulse at the load 89. This follows from the fact that if any one of the four switches was open, there would be no input at coil 21 of the complementing magnetic amplifier and therefore the magnetic amplifier would produce an output in response to the next pulse from source PP-2.

It is noted in connection with FIGURE 5, that the complementing magnetic amplifier requires that its source of power pulses be out of phase with any signal pulses fed to the input coil 21. This is accomplished by connecting the power winding 18 to the source PP-2 which is out of phase with the pulses from the source PP-1, the latter source controlling the flow of pulses to the input coil 21.

Figure 6:
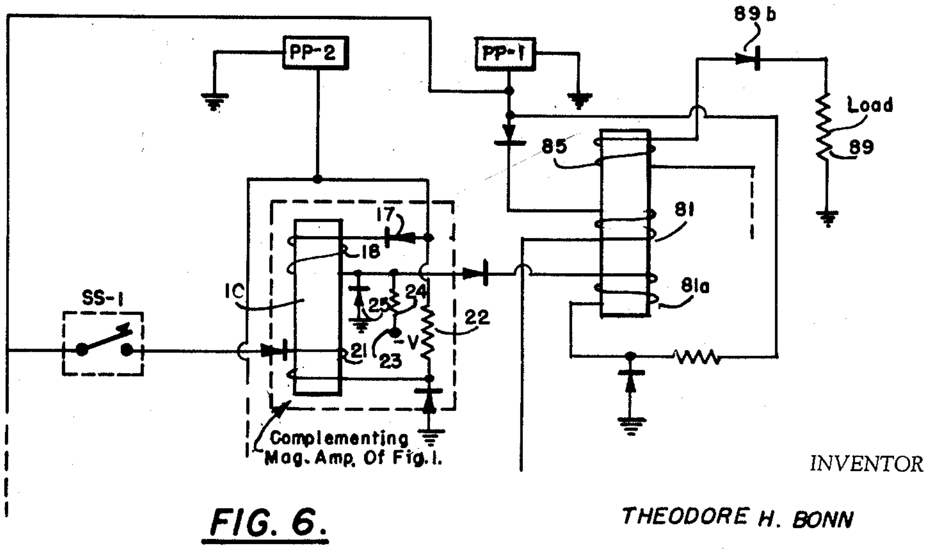
FIGURE 6 is a partial view of another modified form of FIGURE 4.

FIGURE 6 shows a way of reversing the effect of the input pulses to the several magnetic amplifiers of FIGURE 4. A complementing magnetic amplifier of the type shown in FIGURE 1 may be placed between the switch SS-1 and the coil 81*a*. It is required, in connection with the complementing magnetic amplifier of FIGURE 1 that the input signal thereto be out of phase with the power pulse fed thereto. In order to accomplish this, two generators of power pulses PP-1 and PP-2 are used in FIGURE 6 and have the relative waveform shown in FIGURE 8. Switch SS-1 controls the flow of pulses PP-1 to the input of the complementing magnetic amplifier, and source PP-2 controls the flow of power pulses to the coil 18 of the magnetic amplifier. Therefore, the output pulses of the complementing magnetic amplifier are in phase with the pulses of source PP-2 and are fed to coil 81*a* and are therefore out of phase with the pulses from source PP-1 flowing through coil 81. It is understood that FIGURE 6 is only a partial showing and that in a complete system there would be complementing magnetic amplifiers in series with as many of the switches SS-1 to SS-4 inclusive (of FIGURES 4 and 5) as desired.

A still further modification is shown in FIGURE 7 which is likewise a partial view of a complete device such as is shown in FIGURES 4 and 5. In this case, resistor 70 and battery 71 are placed across the coil 81*a* and tend to pass a current through that coil which will reset the core (from point 11 to 13 on the hysteresis loop of FIGURE 2) in event switch SS-1 is open. In event switch SS-1 is closed, the pulses from source PP-2 will cancel the effect of battery 71 and thereby prevent resetting the core. Hence, the effect of the switch SS–1 on the coil 81*a* is reversed in FIGURE 7 as compared to the circuit of FIGURE 5. The resetting circuit 70–71, shown in conjunction with switch SS–1, could equally well be used in connection with switches SS–2 to SS–4 inclusive of FIGURES 4 and 5.

In connection with the remaining figures described in this application, the signal sources are shown conventionally in block form. It is understood that this is merely an expedient of simplicity and that wherever a signal source is shown it may well be any element of a computer circuit which provides the necessary pulses at the correct time and in particular it may involve any one or more of the principles taught in connection with FIGURES 5, 6 and 7. That is, it may be a switching device which controls the flow of pulses from a second pulse source PP–2, as shown in FIGURE 5. Alternatively it may comprise a magnetic amplifier as shown in FIGURE 6, or it may have a resetting circuit 70–71 in combination with the second source of pulses, as shown in FIGURE 7.

FIGURE 9 is a gating circuit in which all or a predetermined number of signal sources SS–1 to SS–3 inclusive must be in the inoperative state (no pulse output) during the period immediately preceding a given positive power pulse from source 90, in order for there to be current in the load 94. The source 90 of alternating voltage (having good voltage regulation) tends to pass current through the coils 91, 92 and 93 in parallel, to the load 94. The three amplifiers operate in substantially the same way as was previously described in connection with FIGURE 1, and they operate on the saturated portions of their hysteresis loop only in the event a given positive power pulse from source 90 was not preceded by a signal pulse. A biasing battery 99*a* passes current through resistor 99*b* and rectifier 99*c* to ground. The resistors 96, 97, 98 and 99*b*, have such resistance values that all three (or a predetermined number) of windings 91, 92 and 93 must be conducting before the power pulses from source 90 are sufficient to overcome the negative bias of the battery 99*a* and produce a current at the load. In other words, if all three secondaries 91, 92 and 93 concurrently have low impedance, the current flowing through the three branch paths 91–96, 92–97 and 93–98 will be sufficient to raise the potential at the upper terminal of the load to a positive value notwithstanding the negative potential of battery 99*a*. Rectifier 99*c* will therefore be cut off, and each positive pulse from source 90 will divide, part of it flowing through resistor 99*b* to battery 99*a* to ground and the remainder through the load 94 to ground.

The signal sources SS–1 to SS–3 of FIGURE 9, as in all other figures, normally produce control pulses only while the potential of source 90 is negative. The fact that source 90 goes negative prevents any positive potentials that may be induced in coils 91, 92 and 93 due to signals fed to the three input windings from the three signal sources from producing currents. in the load circuits. The lower ends of resistors 96, 97 and 98 are clamped to a given positive potential by battery 95 and rectifiers 95*a*, 95*b* and 95*c*. The clamping prevents any one of the three stages from supplying more than its proper share of the load current. The rectifiers 96*a*, 97*a* and 98*a* enable the device to have both a power and an energy gain. That is, more power and energy will appear at the load 94 than is required of signal sources SS–1 to SS–3 inclusive. This result is accomplished since the rectifiers preclude reverse flow of currents in power windings 91, 92 and 93 and enable the generator of power pulses 90 to supply a large flow of current through coils 91, 92 and 93 when they have low impedance and the polarity of the generator 90 is positive.

Figure 10:
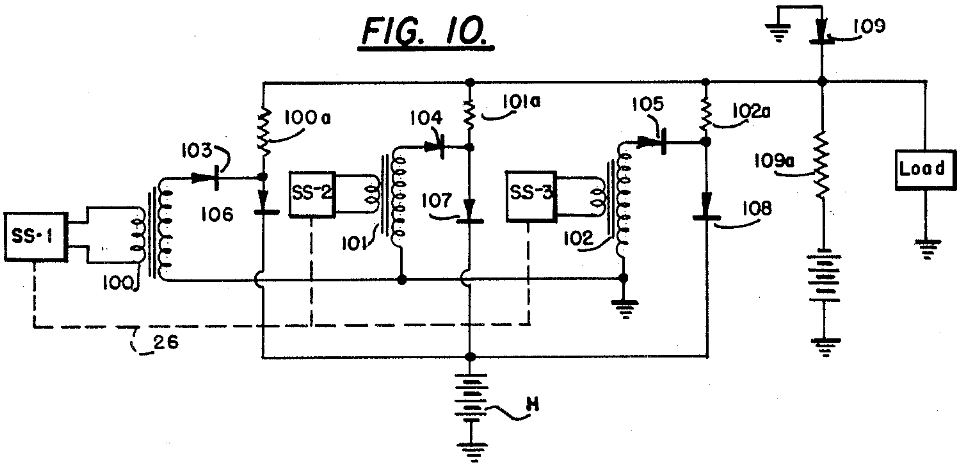
FIGURE 10 is a modified form of FIGURE 9 using pulse transformers in place of magnetic amplifiers.

FIGURE 10 is a modified form of FIGURE 9 employing pulse transformers instead of magnetic amplifiers. No source of power pulses is employed in this form of the device, as the power to the load is supplied by the signal sources through the several pulse transformers. The three signal sources SS–1 to SS–3 inclusive respectively energize the primaries of the three pulse transformers 100, 101 and 102, the secondaries of which produce substantially square wave outputs. The current from the secondaries of the transformers 100, 101 and 102 inclusive respectively flow through rectifiers 103, 104 and 105 and thence respectively through resistors 100*a*, 101*a* and 102*a* to the load. A negative bias current is placed in the output circuit through resistor 109*a*. It is only when all or a given predetermined number of the signal sources SS–1 to SS–3 inclusive are energized that a sufficient potential is developed to overcome the negative bias current and to give a positive output pulse at the load. This is accomplished by properly proportioning resistors 100*a*, 101*a*, 102*a* and 109*a*. A limiter is associated with the secondary of each transformer in order to prevent that particular transformer from delivering in excess of its proportionate share of the necessary current. This limiting is accomplished by rectifiers 106, 107 and 108 in combination with battery H in the manner above described.

Figure 11:
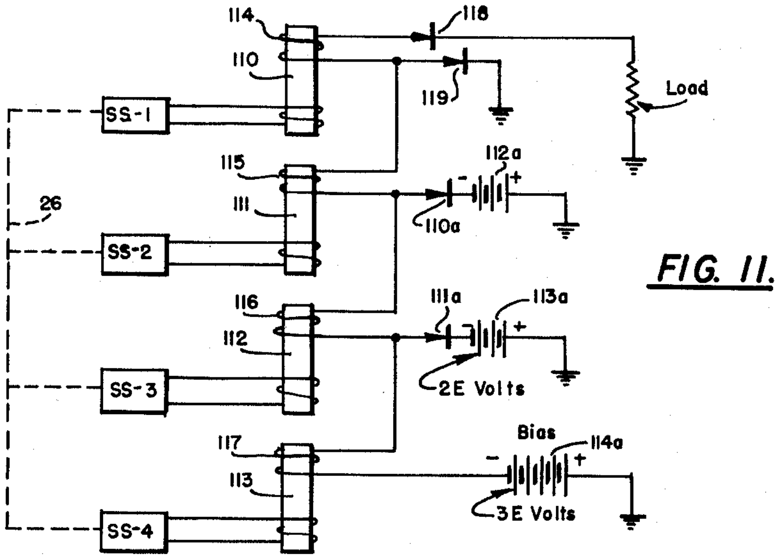
FIGURE 11 is a schematic diagram of a modified form of FIGURE 4 utilizing pulse transformers in place of magnetic amplifiers.

FIGURE 11 is a schematic diagram of a modified form of FIGURE 4 in which pulse transformers are substituted for magnetic amplifiers. A sufficient negative bias 114*a* is placed in the load circuit so that all four of the pulse transformers 110 to 113 inclusive msut be concurrently energized in order to overcome the bias and cause current to flow through rectifier 118 to the load. In order to prevent the secondary 117 from delivering more than its proportionate share of the total potential, limiter 111*a*–113*a* is employed. It is noted that source of bias 114*a* has 3E volts in contrast with 2E volts for source 113*a*. Likewise, limiter 110*a*–112*a* prevents the potential, developed in coils 116 and 117 taken together, from raising the lower end of coil 115 above —E volts. The rectifier 119 prevents the three secondaries 115 to 117 inclusive from raising the lower end of coil 114 above ground potential. Hence, unless all four signal sources SS–1 to SS–4 inclusive are concurrently energized, there will be no flow of current to the load. But if all four of these signal sources are simultaneously energized the combined potentials developed in coils 114 to 117 inclusive will overcome the bias of battery 114*a* and current will flow to the load. As in the case of other figures, suitable means 26 may be employed whereby sources SS–1 to SS–4 emit pulses only at predetermined time intervals.

In order to illustrate a practical application of the invention, I will illustrate the same as replacing a conventional gate in a modern type of half-adder. The half-adder which I choose to mention in connection with this explanation is the one which is the subject matter of co-pending application of Joseph D. Rutledge, Serial No. 424,035 filed April 19, 1954, issued September 17, 1957 as Patent No. 2,806,648, entitled "Half-Adder for Computing Circuits," assigned to the same assignee as the present case.

Figure 12:
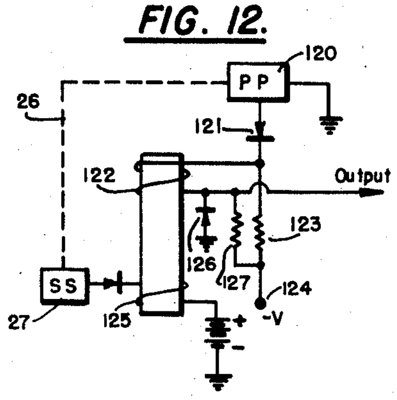
FIGURE 12 is a schematic diagram of a non-complementing magnetic amplifier useful in explaining the circuit of FIGURE 13.

In order to understand the half-adder circuit of Rutledge, it is first desirable to explain the operation of a non-complementing magnetic amplifier. A typical non-complementing magnetic amplifier is illustrated in FIGURE 12 and employs a source 120 producing an uninterrupted train of power pulses which are equally spaced and generally the spaces between the pulses are equal to the duration of the pulses. The signal source 127 produces from time to time the control signals and by reason of any suitable means SS, these control signals are always synchronized to appear during spaces between the power pulses. When the power pulses from source 120 are positive they pass through rectifier 121, coil 122, resistor 127 to negative pole 124 which is below ground potential. If we assume that at the start of the first pulse the core was at point 14 on its hysteresis loop (see FIG- URE 1), it will be driven to point 15. At the conclusion of the first pulse, current will flow in the following circuit: from ground to rectifier 126, coil 122, resistor 123, to negative pole 124. This is a current flow through coil 122 in the opposite direction from that of the first pulse and drives the core negatively from point 11 to point 13. At the conclusion of this reverse pulse, the second power pulse will drive the core positively from point 13 through point 14 to point 15, and from thence it will go to 11, after the conclusion of the second pulse. The next action will be another flow of current in the following circuit: from ground, rectifier 126, coil 122, resistor 123, to negative pole 124.

Hence, the magnetization of the core will repeatedly traverse the hysteresis loop and the majority of the time the core will be operating on unsaturated portions of the hysteresis loop, consequently there will be substantially no output. If, however, an input signal is received in coil 125, at a time when the core is at point 11, the reverse current (in circuit: ground 126–122–123–124) will not drive the core negatively to point 13 as usual. In such situation, there will be two opposite magnetizing forces on the core. On the one hand, there will be a flow of current in the circuit: ground to rectifier 126, coil 122, resistor 123, to negative pole 124, tending to apply a negative magnetizing force to the core. There will be an additional input current in coil 125 tending to apply a positive magnetizing force to the core. These two magnetizing forces will cancel each other and the core will remain at point 11 on the hysteresis loop. Consequently, the next power pulse will pass through rectifier 121 and coil 122 to the output. It will drive the core from point 11 to point 12 on the hysteresis loop. The core is substantially saturated throughout this entire period, and therefore a large pulse output will appear. The operation of the non-complementing amplifier may be summarized by stating that the currents will drive the core around the hysteresis loop without substantial saturation and therefore without any substantial pulse output until there is a current flow through coil 125. This will interrupt the alternating magnetizations of the core, allowing the next power pulse to saturate the core and give a large output.

Figure 13:
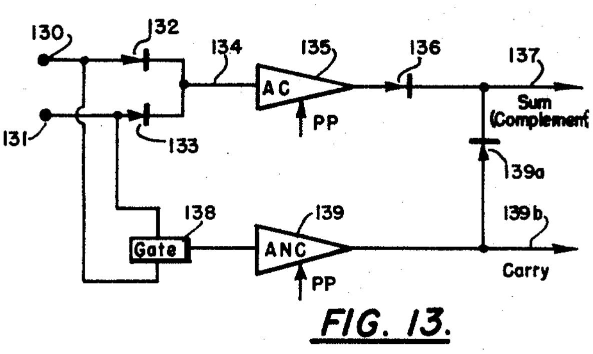
FIGURE 13 is a block diagram of a half-adder employing a gate. This figure is not part of my invention but is included for purposes of enabling me to point out how one of my novel gates may replace the conventional gate of this circuit.
Figures 14, 16:
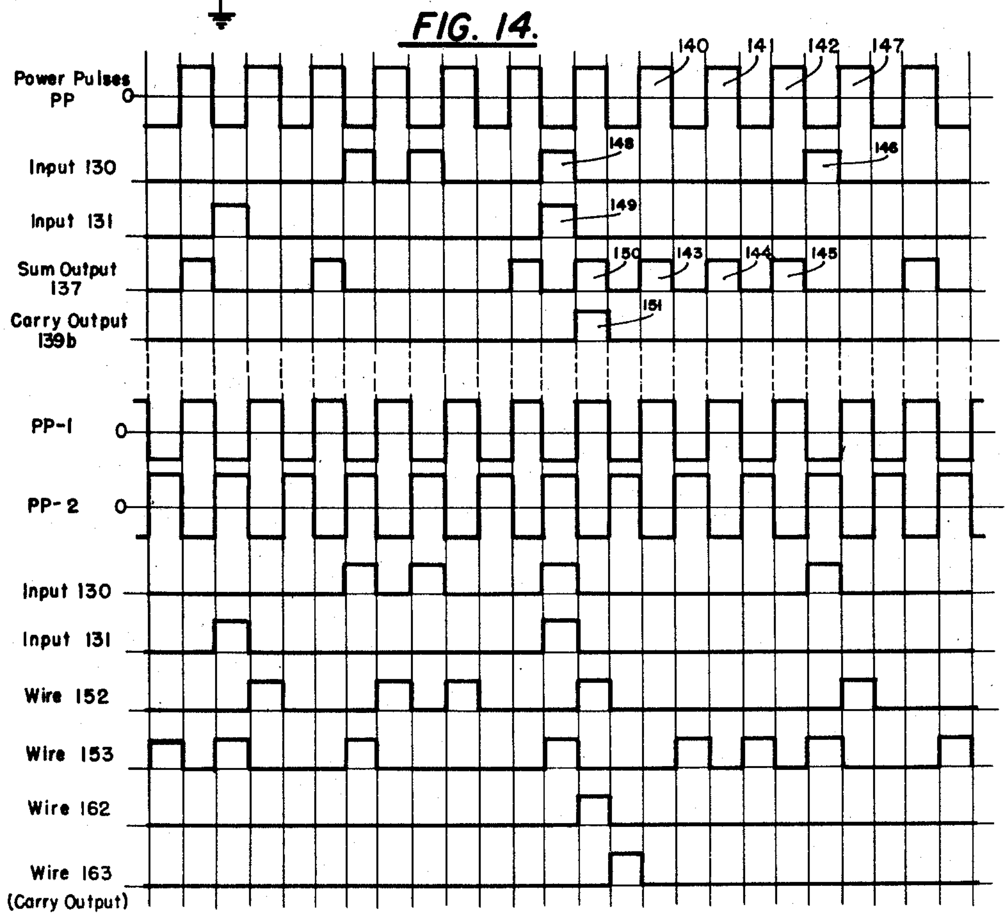
FIGURE 14 is a waveform diagram of the device of FIGURE 15.
FIGURE 16 is a waveform diagram of the device of FIGURE 15.

FIGURES 13 and 14 illustrate the half-adder invented by Rutledge as aforesaid, and wherever in the following description of those figures reference is made to a complementing magnetic amplifier, it is understood that such amplifier may be of the type shown in FIGURE 1 of this application; and wherever reference is made to a non-complementing magnetic amplifier it is understood that the amplifier of FIGURE 12 may be used.

Referring now to the block diagram of FIGURE 13, it is noted that the complementing magnetic amplifier 135 passes a continuous series of power pulses PP–1 through buffer 136 to the "sum" output 137, in the absence of a signal on wire 134. The two binary signals to be added, which may have the waveforms shown in FIGURE 14, are fed onto terminals 130 and 131 from a magnetic store or other element. If there is a signal on either one of these inputs 130 or 131, the next succeeding power pulse to amplifier 135 produces no output. This is clearly illustrated in FIGURE 14 where it is noted that power pulses PP–1 occur at 140, 141 and 142 respectively, producing "sum" output pulses at 143, 144 and 145. However, when input pulse 146 occurs at input 130, the next succeeding power pulse 147 does not flow to the "sum" output 137. When input pulses occur simultaneously at input terminals 130 and 131, the diode gate 138 becomes conducting and triggers the non-complementing magnetic amplifier 139 so that the latter allows the next power pulse to flow to the "carry" output 139*b* and the "sum" output 137. This is clearly illustrated in FIGURE 14 which shows the inputs 130 and 131 as having received input pulses 148 and 149. These cause a pulse 150 at the "sum" output 137 and a pulse 151 at the "carry" output 139*b*.

It follows from the foregoing that when there is no signal on either input, there will be no signal at the "carry" output 139*b* and there will be a continuous series of power pulses at the "sum" output 137. When there is a pulse on just one of the input terminals 130 and 131, there will be a pulse on wire 134 which will interrupt the next power pulse from amplifier 135 and give an indication in the "sum" output 137 by the absence of a pulse. When there are simultaneous input pulses on both terminals 130 and 131, the amplifier 139 allows the next power pulse to pass to the "carry" output 139*b*, indicating a "carry" digit and also to pass to the "sum" output 137 indicating the lack of a sum.

The gate 138 of FIGURE 13 is the important element so far as the present application is concerned, inasmuch as the present application discloses a novel gate which may be substituted for the gate 138 of FIGURE 13. In FIGURE 13 the gate 138 produces an output pulse only when there are concurrent input pulses on input wires 130 and 131. In other words, in event there are simultaneous input pulses on wires 130 and 131, the gate will supply an input pulse to amplifier 139. In the aforesaid Rutledge application, the gate 138 is the conventional diode gate.

Figure 15:
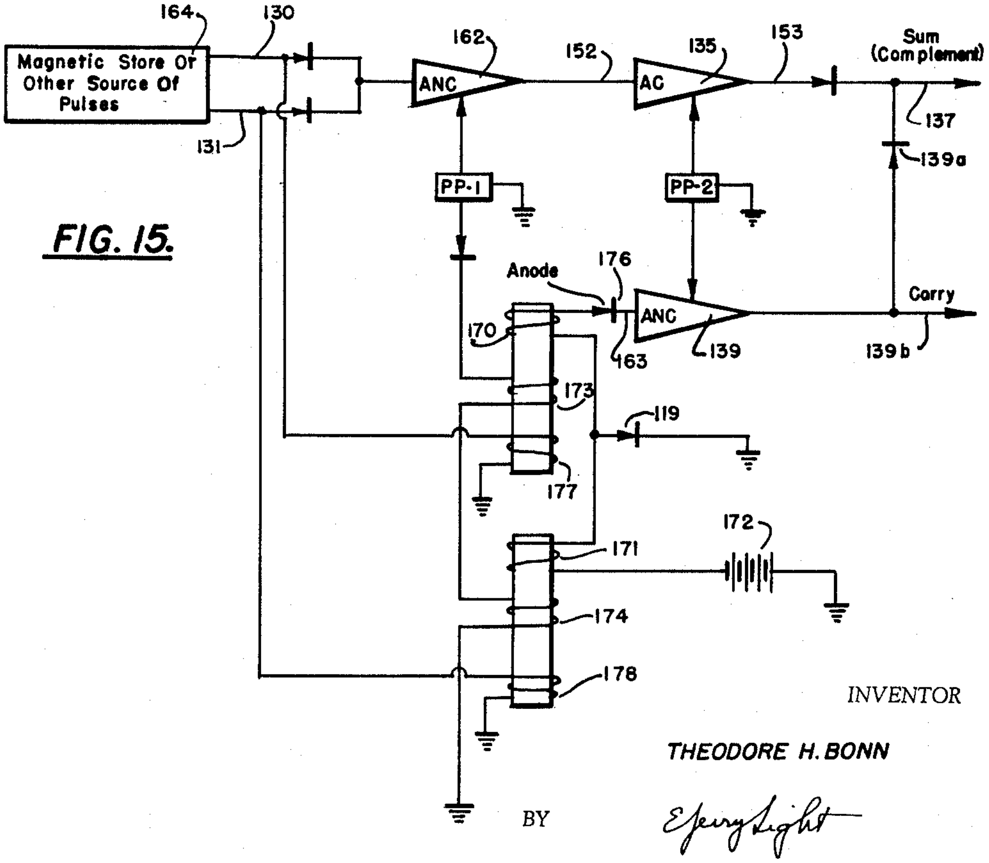
FIGURE 15 is partly a block and partly a schematic diagram of the half-adder of FIGURE 13 with my novel gate shown in place of the conventional gate.

FIGURE 15 is a semi-schematic diagram of the circuit of FIGURE 13 with the gate of the present invention substituted for the gate 138 of FIGURE 13.

In connection with FIGURE 15, those parts which are identical with corresponding parts of FIGURE 13 bear like reference numbers. There are two generators of power pulses PP–1 and PP–2 which have the waveforms shown in FIGURE 16. It is to be noted that the sources supply constant potential pulses to the amplifiers 135, 139 and 162, and supply constant current pulses to windings 173 and 174.

In FIGURE 15 the parts 170 to 178 inclusive represent a gating circuit built according to the teachings of FIGURE 4 and which replaces the gate 138 of FIGURE 13. The gating circuit of FIGURE 15 has secondary coils 170 and 171 in series with battery 172 and so arranged that if either of the secondaries 170 or 171 alone has a maximum potential induced therein, that potential will be counteracted by the negative bias of the battery 172 and no current will flow through rectifier 176 to the input 163 of the non-complementing magnetic amplifier 139. In event maximum potential is concurrently induced in both of coils 170 and 171, the negative bias of the battery 172 is more than overcome and a positive pulse flows through rectifier 176 to the input 163 of the non-complementing magnetic amplifier 139. Source of power pulses PP–1 tends to pass current through coils 173 and 174 to ground. Input coils 177 and 178 are respectively energized by the input pulses 130 and 131 from the magnetic store or other source of pulses As shown in FIGURE 16, pulses from the magnetic store or other source always occur on inputs 130 and 131 during the spaces between pulses of source PP–1, in other words, during the periods of positive pulses from source PP–2. In event there are no pulses on inputs 130 and 131 neither of the coils 177 or 178 will reset its respective core and the power pulses from source PP–1 flowing through the coils 173 and 174, will saturate the cores and there will be very small potentials induced in coils 170 and 171. The negative bias of battery 172 will therefore not be overcome and there will be no pulse flowing to the input 163. In event only one of the inputs 130 or 131 is energized, the result will be the same, although the reason why is slightly different. Assume that a pulse exists on wire 130 without a pulse on wire 131. The pulse on input 130 flowing through the coil 177 will reset the upper cores whereas the lower core will not be reset. Hence, the next pulse from source PP–1 flowing through coils 173 and 174 will drive the upper core along an unsaturated portion and induce maximum potential in coil 170, while the current flowing through coil 174 will saturate the lower core and induce practically no potential in the coil 171. Since maximum potential across coil 170 is insufficient to overcome the negative bias of battery 172, there will be no flow of current to the input 163. On the other hand, if input signals appear simultaneously on inputs 130 and 131, both cores will be reset during the spaces between pulses of source PP–1 and the next pulse from that source will flow through coils 173 and 174, driving both cores along unsaturated portions and inducing maximum potentials in coils 170 and 171, thus overcoming the negative bias of battery 172 and supplying a pulse to the input 163.

It is noted that by inserting the magnetic gate of the present invention for the diode gate of Rutledge, the output 162 from the gate has been displaced by one time period with respect to the input. Therefore, in order to prevent this from having an adverse effect upon the half-adder circuit, it is necessary to delay the pulses that would normally appear at the input of complementing magnetic amplifier 135 by one time period, and consequently, the non-complementing magnetic amplifier 162 is placed in series with the input 152 of the complementing magnetic amplifier 135. It is clear from the foregoing description that the pulses received on wires 152 and 163 are identical with the pulses received at the inputs of amplifiers 135 and 139 of FIGURE 13, the only difference being that the pulses in FIGURE 15 are displaced from those of FIGURE 13 by one time space.

A second source of power pulses PP–2 is therefore employed in connection with amplifiers 135 and 139 of FIGURE 15 so as to properly amplify the delayed pulses which are received by those amplifiers and as a result, the outputs on wires 137 and 139*b* of FIGURE 15 are identical with those on similar wires of FIGURE 13 except displaced by one time period.

The waveform diagram of FIGURE 16 clearly shows the relations of pulses in the device of FIGURE 15, and shows that the mode of operation of FIGURE 15 is substantially identical with that of FIGURE 13 except as hereinabove pointed out. In order to visualize the "sum" output of FIGURE 15, it is merely necessary to add together the pulse appearing on wire 153 of FIGURE 16 with those appearing on wire 163.

As shown in FIGURE 15, the source of pulses 164 may be a magnetic store or any other source of controlled pulses. If it is a magnetic store, it may be of any suitable type, and would have the several binary numbers stored therein in such a way that when the apparatus is in operation the binary signals emerging therefrom will be in the form of pulses appearing during the spaces between the pulses of source PP–1. This is clearly shown in FIGURE 16 where all of the pulses on inputs 130 and 131 appear during the spaces between pulses of source PP–1.

In event the device 164 is a mechanism other than a magnetic store, so that it is a trigger device which controls the flow of pulses to wires 130 and 131, it would normally be fed with pulses from source PP–2 since the pulses of this source appear during the gaps between the pulses of source PP–1. It is understood that in connection with a complete computing system embodying magnetic amplifiers, the two sources of power pulses PP–1, and PP–2 would normally be present and would supply pulses to a large number of different magnetic devices throughout the entire computer system, consequently each element, such as 164, which might feed the input to the new gating system would normally be fed with power pulses from one of the two sources PP–1 or PP–2 contained in the overall system. In adapting the gate to such a situation, it is merely necessary for the gate to be connected to the source of power pulses other than the one which supplies power pulses to the control element of which 164 is an example.

While the invention has been described broadly in connection with figures such as FIGURE 4, it is understood that it has a wide variety of detailed applications in computer circuits of which FIGURE 15 is one example. It is my intention to claim the invention not only as a separate element such as is shown in connection with FIGURE 4, but to claim it in combination with other elements as a part of a complete computer circuit. FIGURE 15 is an example of such a combination which involves the novel gating system in a typical relation with other elements of a computer circuit.

Figure 17:
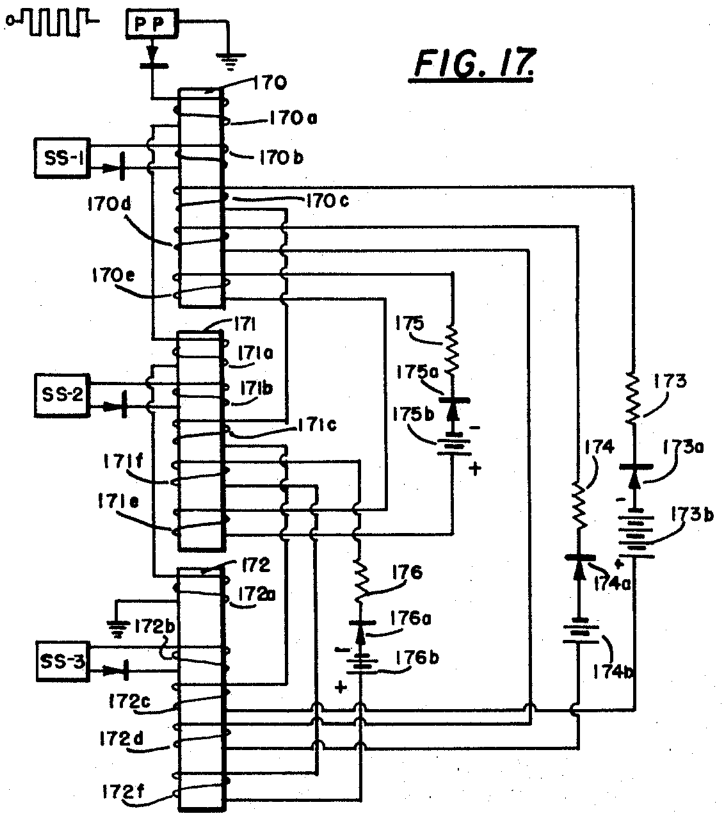
FIGURE 17 is a system of threshold gates wherein signals in the outputs will show which combinations of signal sources are energized.

FIGURE 17 is another illustration of the principles of threshold gating. In it there are three signal sources, SS–1, SS–2 and SS–3, and four loads 173 to 176 inclusive. The energizations of the loads will indicate which combinations of signal sources are concurrently energized.

There are three magnetic cores 170, 171 and 172 of the types heretofore mentioned, having power windings 170*a*, 171*a* and 172*a* respectively. These power windings are in series with each other as well as in series with the source of alternating current power pulses PP. A rectifier is normally included in the circuit to limit the flow of current to one direction only.

The signal sources SS–1, SS–2 and SS–3 respectively control coils 170*b*, 171*b* and 172*b*, and a signal from one of the sources tends to revert its complementary core to point 14 on the hysteresis loop of FIGURE 2 so that the next power pulse from source PP will drive the core along the unsaturated portion thereof, 14–15, and thus induce potential in the secondary coils which are located on the cores. The cores respectively have coils 170*c*, 171*c* and 172*c* connected in series with each other, as well as in series with load 173, rectifier 173*a* and battery 173*b*. Battery 173*b* normally places such a large negative potential on the anode of rectifier 173*a* that no current can flow in the circuit unless potential is induced in all three of coils 170*c*, 171*c* and 172*c*. In other words, the potential of battery 173*b* is slightly greater than the potential normally expected from the two secondaries 171*c* and 172*c* if energized together in the absence of an induction of potential in the coil 170*c*. In event only two of the three coils 170*c* to 172*c* receive induced potential, there will be no flow of current in the load 173 but that load will receive a current in event all three coils 170*c* to 172*c* have induced potentials therein.

Load 174 is in series with rectifier 174*a* and battery 174*b*. The latter normally biases the anode of rectifier 174*a* negatively so that in event potentials are induced in one only of coils 170*d* and 172*d*, the potential of the battery will not be overcome and no current will flow in the load 174; however, if potential is induced in both coils 170*d* and 172*d* simultaneously, the potential induced in the two coils will be twice that of battery 174*b* and will tend to cause flow of current in the opposite direction from that of battery 174*b* and therefore current will flow in the load 174.

Load 175 is in series with rectifier 175*a* and battery 175*b*. The latter normally biases the anode of rectifier 175*a* negatively so that no current will flow in the load until the potential built up in coils 170*e* and 171*e* is greater than that of the battery 175*b* and in the opposite direction from the potential of the latter. When only one of coils 170*e* and 171*e* is energized, the potential of the battery 175*b* is not overcome; however, when both coils 170*e* and 171*e* receive induced potential the potential of battery 175*e* is overcome and current flows in the load 175.

The load 176 has rectifier 176*a* and battery 176*b* in series with it. The latter biases the anode of rectifier 176*a* negatively so that no current flows in the load circuit until the potential of the battery is overcome. If only one of the secondary coils 171*f* or 172*f* is energized, the potential of the battery 176*b* will not be overcome and no current will flow in the load 176; however, if potential is induced in both of the coils 171*f* and 172*f*, current will flow to the load 176.

When the load 173 is energized, that is an indication that all three signal sources were energized concurrently.

When load 174 is energized, it is an indication that signal sources SS–1 and SS–3 were energized concurrently. When load 175 is energized, it is an indication that signal sources SS–1 and SS–2 were energized concurrently. When load 176 is energized, it is an indication that signal sources SS–2 and SS–3 were energized concurrently.

Figure 18:
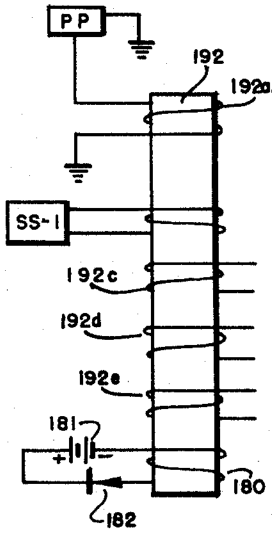
FIGURE 18 shows a regulating winding that may be employed in conjunction with any of the forms of the invention.

FIGURE 18 illustrates a modification of FIGURE 17 which may be included in the device of FIGURE 17 if desired. In order to limit the potential induced in the coils on the cores so that irrespective of the operation of the device any one coil will always produce a given potential when the core is in the high impedance state, the coil 180 in series with a source 181 and a rectifier 182 may be employed. When the core is in the high impedance state and a power pulse flows through 192*a*, the flux may readily change until the potential induced in coil 180 exceeds and opposes that of battery 181. When the induced potential exceeds that of the battery, rectifier 182 conducts and constitutes a low impedance path around the coil 180 which tends to prevent further change of flux through the core. Hence, the rate of change of the flux is limited and consequently the potentials induced in coils 170*c*, 170*d* and 170*e* are likewise limited. The improvement constituting parts 180 to 182 may be applied to any of the cores in any of the figures.

Figures 19, 21:
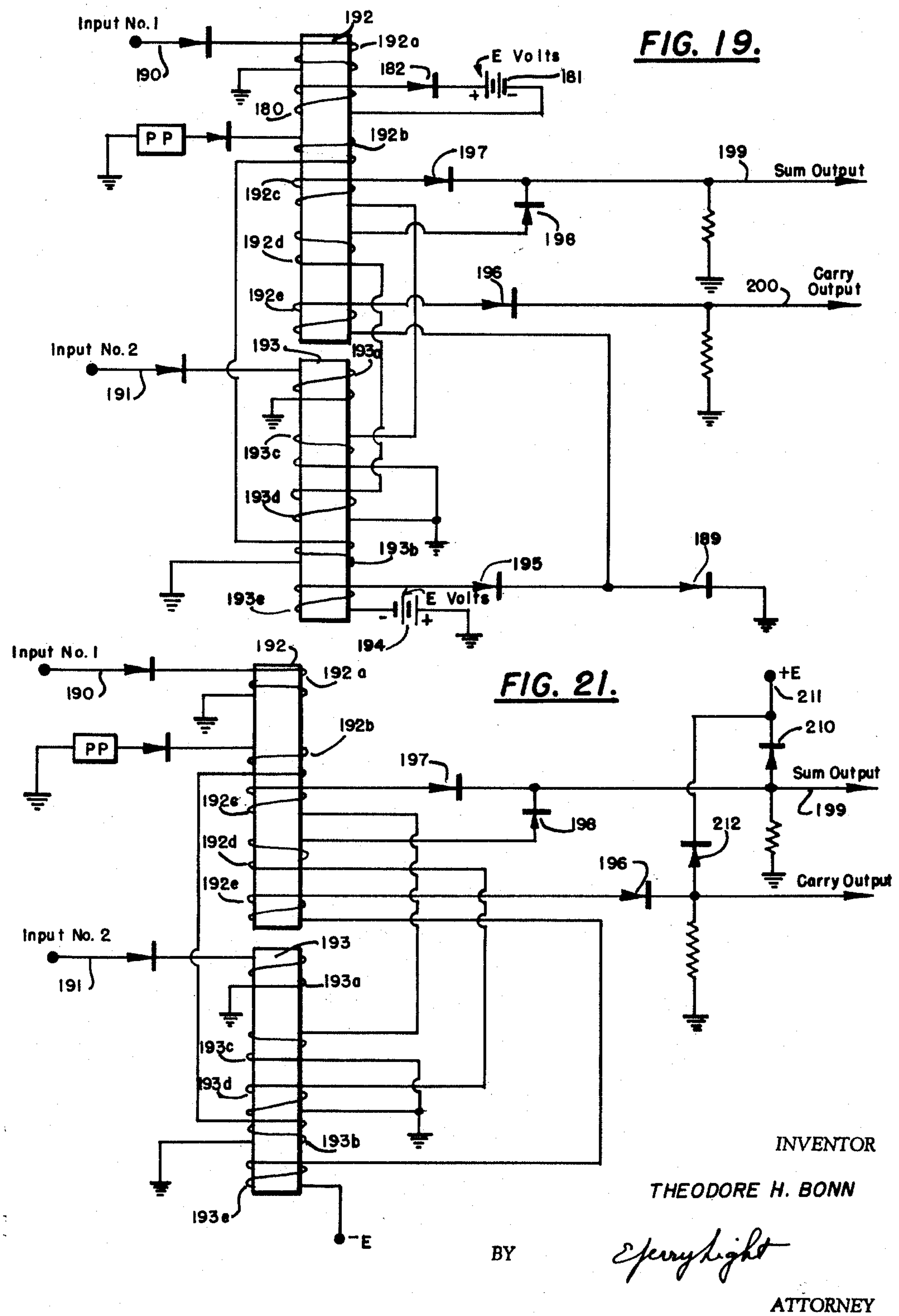
FIGURE 19 shows a half-adder involving threshold gates of the types herein disclosed.
FIGURE 21 shows an alternate form of half-adder involving threshold gates.

As hereinbefore stated, the primary object of the invention is to provide a new gating system component which may be connected with other such components (and with other components such as magnetic stores) to form a complete computing or data translating system. FIGURE 19 is one illustration of how the coils of a threshold gating system may be interconnected to form a half-adder.

FIGURE 19 illustrates two inputs 190 and 191 for receiving the two input signals to be added. As is known in connection with half-adders operating on the binary system, when neither input is energized at a given signal time period there should be no signal at the sum output 199. If either input 190 or 191 is alone energized, there should be a signal at the sum output 199 but no signal at the carry output 200. In event both inputs 190 and 191 are energized concurrently, there should be no signal at the sum output 199 and a signal at carry output 200. The input signals received at inputs 190 and 191 are usually serial trains of pulses so spaced that they represent binary numbers. The signals on the two inputs are properly synchronized so that they constitute two numbers to be added.

The magnetic cores 192 and 193 are the same as those described in conjunction with the other figures of this application. Input 190 controls coil 192*a* and input 191 controls coil 193*a*. Alternating current power pulses are fed from source PP through coils 192*b* and 193*b*. The carry output circuit includes coils 192*e* and 193*e* in series with battery 194, rectifiers 195 and 196 and the carry output terminal 200. Rectifier 189 prevents the potential induced in coil 193*e* from exceeding E volts.

Coils 192*c*, 192*d*, 193*c* and 193*d* in conjunction with rectifier 197 and 198 control the sum output 199.

Figure 20:
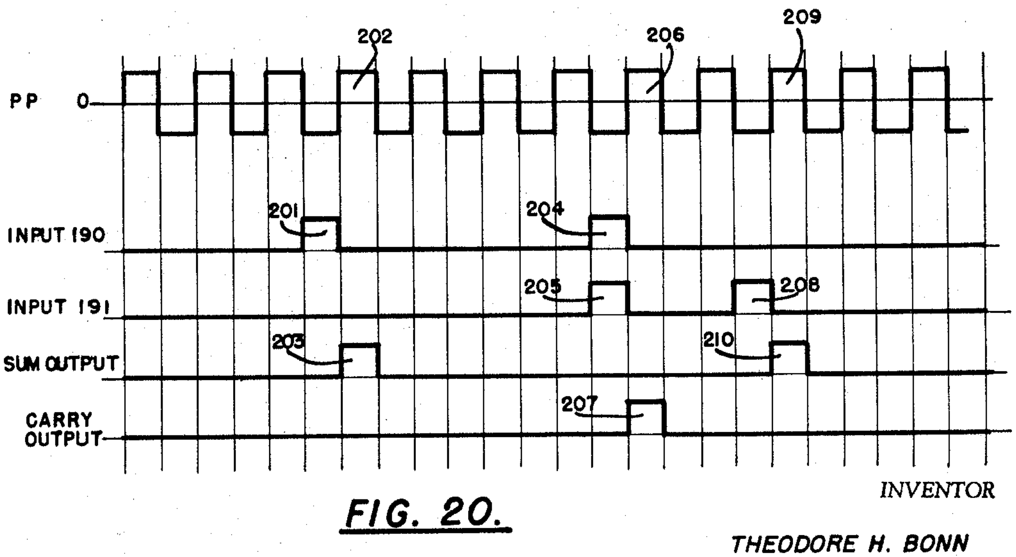
FIGURE 20 is a timing diagram of the device of FIGURE 19.

On positive halves of the cycle, the source PP energizes coils 192*b* and 193*b* tending to drive the cores from point 14 to point 15 on the hysteresis loop of FIGURE 2. If there are no inputs at 190 and 191, the cores are not reverted to point 14 during the spaces between power pulses and accordingly the next power pulse from source PP saturates the cores 192 and 193. Since the cores are operating on saturated portions thereof, the flux change will be small and no potentials will be induced in coils 192*c*, 192*d*, 192*e*, 193*c*, 193*d* and 193*e*. It follows that there will be no outputs at either sum output 199 or carry output 200. This condition is illustrated in FIGURE 20 prior to the time that pulse 201 arrived at input 190. The input pulses always arrive during signal time periods, that is during the intervals when source PP is going negative. As shown in FIGURE 20, when pulse 201 arrives at input 190, it flows through coil 192*a* and reverts the core 192 to point 14 so that the next positive power pulse 202 from source PP will drive the core along the unsaturated portion thereof from point 14 to point 15 and thus induce in the coils 192*c*, 192*d* and 192*e* a potential of E volts. Since core 193 was not reverted by a signal pulse, no potentials are induced in coils 193*c*, 193*d* and 193*e* by the positive pulse 202. As stated, the rapid flux change in core 192 induced a potential in coil 192*c* and current will therefore flow through rectifier 197 to sum output 199. The complete circuit through which this current flows is as follows: coil 192*c*, rectifier 197, output 199, ground, coil 193*c*, back to coil 192*c*. Hence, there will be a sum output at 199. There will be no carry output at 200, for although a potential is induced in coil 192*e*, it is approximately equal and opposite to the potential of battery 194 and therefore these two potentials cancel.

As shown in FIGURE 20, the apparatus has no further input pulses until at a later time pulses 204 and 205 appear concurrently on inputs 190 and 191 during a signal time period. These pulses respectively flow through coils 192*a* and 193*a* and revert both cores 192 and 193 so that the next positive pulse 206 from power pulse source PP induces potential in all of the secondary coils on both of the cores. Hence there will be potentials of E volts induced in both coils 192*e* and 193*e*. The potential induced in coil 193*e* will be equal and opposite to that of battery 194 and hence the cathode of rectifier 195 is essentially at ground potential. The potential induced in coil 192*e* will raise the anode of rectifier 196 to +E volts and consequently that potential will appear at carry output 200 in the form of pulse 207 (see FIGURE 20). There will be no output at the sum output 199 under these circumstances, since coils 192*c* and 193*c* are wound in opposite directions so that the potentials they produce are equal and opposite and cancel each other. Likewise, coils 192*d* and 193*d* are wound in opposite directions and their potentials cancel each other. There are no further input pulses until pulse 208 (of FIGURE 20) appears at input 191. That pulse reverts the core 193 during a period when core 192 is not reverted. Hence, the next positive power pulse 209 from source PP drives core 192 along a saturated portion thereof and core 193 along an unsaturated portion thereof so that potentials are induced in coils 193*c*, 193*d* and 193*e* but no potentials are induced in coils 192*c*, 192*d* and 192*e*. The potential in coil 193*d* will cause a flow of current as follows: coil 193*d*, coil 192*d* (which has low impedance) rectifier 198, sum output 199, ground, back to coil 193*d*. Hence there is a sum output at 199. There is no carry output at 200 since only one of the two coils 192*e* and 193*e* has a potential induced in it. The potential induced in coil 193*e* is equal and opposite to that of battery 194, hence the rectifier 195 is at ground potential. There is no potential induced in coil 192*e* and hence rectifier 196 remains at ground potential as does carry output 200.

The coil 180, battery 181 and rectifier 182 control the flux change in the core 192 and prevent any of the coils 192*c* 192*d* and 192*e* from generating more than E volts, all as explained in connection with FIGURE 18. It is unnecessary to have all three of these elements on core 193 in addition to the elements already described, since some of the elements associated with core 193 may serve a dual purpose. Battery 194 may serve the purpose already ascribed to it and in addition serve a purpose equivalent to battery 181. Therefore, it is merely necessary to add rectifier 189 in order to control the potentials induced in coils on the lower core 193. It is noted that the combination of coil 193*e*, battery 194, rectifier 195 and rectifier 189 will provide the limiting function described in connection with parts 180, 181 and 182. In event the potential induced in coil 193*e* should exceed E volts, current would flow through rectifier 189 and limit the rate of change of the flux in core 193 so that the potentials induced in the three secondary coils of core 193 will all be E volts.

FIGURE 21 is a description of a half-adder similar in all respects to that of FIGURE 19 except in regard to the voltage limiting functions on the cores. The corresponding parts on FIGURE 19 and 21 are designated by similar reference numbers. For purposes of the present discussion, rectifier 212 may be omitted and the apparatus will first be described without it and later with it.

Rectifier 210 in combination with a source of potential 211 which has E volts above ground will provide the necessary limiting function. In event core 192 is operating on an unsaturated portion while core 193 is saturated, it is of course merely necessary to limit the flux change in core 192. This will be done since coil 192*c* will have a potential induced in it. This potential is contributed solely by the flux change in core 192 and therefore by limiting the potential on output 199, the rate of flux change in core 192 is limited. Likewise, in the case where input 191 is the only one that is energized so that core 193 is the only one operating on an unsaturated portion of its hysteresis loop, the only potential contributed to the sum output 199 will be by virtue of coil 193*d* and by limiting the potential at output 199, through the rectifier 210 and the positive source 211, the rate of flux change in core 193 will be limited and the potential induced in all of coils 193*c*, 193*d* and 193*e* will be actually limited to E volts. It is normally unnecessary to limit the potential at the carry output and consequently rectified 212 may be omitted. If inputs 190 and 191 are both energized and coils 192*e* and 193*e* contribute more than E volts each, it will merely mean that the carry output will rise above E volts but no harm will be done in this regard. If, however, it is desired to limit the carry output potential to E volts, rectifier 212 may be added. This will tend to control the duration of the carry output pulses and have other obvious minor advantages.

I claim to have invented:

1. In an electrical circuit; a plurality of sources of signal pulses; and means responsive to signal pulses from a plurality of said sources for producing including at least one complementary source an output pulse comprising a core for each source, said core being substantially saturated at remanence, means for altering the magnetization of each core in response to a signal from the complementary source, potential developing means including a second and third winding on each core for developing a potential in said third winding in response to energization of said second winding following magnetization of the core, in response to said signal, and output means interconnecting the third windings for producing an output condition in response to development of given potentials therein by a given plurality of said potential developing means, said output means including a potential source of fixed bias connected in series with said third windings which opposes the potentials of each of said plurality of potential developing means and precludes the potentials of the potential developing means from producing said output condition until said given plurality of potential developing means are concurrently energized to produce a potential that overcomes that of said fixed bias.

2. An electrical circuit comprising a plurality of sources of signal pulses including at least one complementary source, a core for each source, said core having a substantially rectangular hysteresis loop, a first winding on each core connected to its complementary source, potential developing means associated with each core for developing a potential depending on the magnetization of the core including a second and third winding on the core, means for concurrently energizing each of said second windings and means for giving a predetermined output in response to development of given potentials in a given plurality of said third windings in response to energization of said second windings, said last-named means including a potential source of fixed bias connected in series with said third windings to oppose the potentials developed in each of said third windings and allow an output signal to appear only if a given plurality of said third windings each concurrently develop a given potential.

3. An electrical circuit comprising a plurality of signal sources including at least one complementary source; a transformer for each of said sources, each transformer having a primary connected to its complementary source; each transformer having a secondary; an output circuit interconnecting said secondaries for producing an output signal in event a given plurality of said secondaries have potentials induced therein concurrently, said output circuit including a source of bias connected to the output for preventing appearance of an output signal in event less than said predetermined number of secondaries concurrently developed potentials induced therein, and means for limiting the potential induced in each of said secondaries.

4. An electrical circuit comprising a plurality of signal sources including at least one complementary source a transformer for each of said sources; each transformer having a primary connected to its complementary signal source and a secondary, an impedance means in series with each secondary, each impedance means and its secondary forming a branch circuit, means connecting said branch circuits in parallel with each other, and output means including a load and a source of bias connected to said branch circuits for surpassing current flow from said branch circuits to said load until the sum of the currents in said branch circuits exceeds a predetermined minimum established by said source of bias.

5. An electrical circuit as defined in claim 4 including a limiter connected to each branch circuit to limit the current flow therein and thereby limit the magnitude of the contribution of each branch circuit to the sum of the currents from the branch circuits.

6. A gate for an electrical circuit comprising a plurality of magnetic amplifiers having cores characterized by substantially rectangular hysteresis loops, each of said amplifiers having a power winding, the power windings being connected in parrallel with each other, a source of power pulses tending to pass current through the parallel connected power windings, a load in series with said source and said parallel windings, means for biasing the load so that it is energized by said pulses only when at least a predetermined current flows through said parallel power windings, a control winding on each core, and means for selectively energizing the control windings during the spaces between pulses to thereby condition the cores to allow current flow through each of said parallel power windings from said source of power in dependence upon the energization of the corresponding control winding the resistances of the parallel circuits including said windings being so related to each other and to said biasing means that only when said predetermined current flow through said parallel power windings is energy fed to said load.

7. A gating circuit comprising a source of pulse energy, a load, means for gating the flow of energy from said source to said load including a plurality of transformers respectively having secondary windings connected together in series so that a predetermined plurality thereof must have predetermined potentials across the same in order to deliver a cumulative given potential to the load, and a plurality of voltage limiters each respectively connected to an associated one of said secondary windings to oppose their respective potentials and thereby limit their contributions to the energy flowing to said load.

8. In a computer circuit, a plurality of signal circuits carrying pulses representing binary numbers, a saturable core for each circuit, a winding on each core connected to its complementary signal source for resetting the core in response to each signal pulse, pulse generator means for generating a train of spaced pulses, the signal pulses occurring during spaces between pulses of the pulse generator, a primary winding on each core energized by said pulse generator means for periodically setting those of said cores previously reset by signal pulses, a secondary winding on each core, said secondary windings each having a potential produced therein in response to said spaced pulses and a series circuit including said secondary windings and also including a rectifier, a driven circuit and a source of potential bias of magnitude greater than the potential induced in any one of said secondary windings, said source of bias and the rectifier being serially connected and having such polarities that current will flow to said driven circuit only if the sum of the potentials developed in said secondaries exceed the potential of the source of bias.

9. A gate for an electrical circuit comprising a source of pulses, a plurality of magnetic amplifiers having cores characterized by substantially rectangular hysteresis loops, each of said amplifiers having a power winding, the power windings being shunted across each other, a source of power pulses tending to pass current through the shunted power windings, a load in series with said source, means for biasing the load so that it is energized by said pulses only when at least a predetermined current flows through the shunted windings, a control winding on each core, means for selectively energizing the control windings during the spaces between pulses to condition the cores for the time when pulse energy is impressed on the power windings, the resistances of the circuits including said windings being so related to each other and to said biasing means that a predetermined number of said magnetic amplifiers must pass current through said shunted windings before pulse energy from said source will be fed to said load, and rectifier means in series with each power winding.

10. A gate for an electrical circuit as defined in claim 9 having a limiter connected to each secondary winding to limit the magnitude of its contribution to the load.

11. In combination, at least three saturable cores, means for applying spaced pulses of magnetizing forces to said cores, input means associated with each core for reverting the core during the spaces between pulses in response to predetermined input conditions, at least first, second and third coils on each core, first, second, third and fourth loads, means connecting the first coils of each core to the first load and including means to energize the first load only if all three of said first coils have predetermined potentials concurrently induced in them, means connecting the second coils of the first and second cores to the second load and including means to energize the second load only if both the coils connected thereto have predetermined potentials concurrently induced therein, means connecting the third coils of the second and third cores to the third load and including means to energize the third load only if both the coils connected thereto have predetermined potentials concurrently induced therein, and means connecting the third coil of the first core and the second coil of the third core to the fourth load and including means to energize the fourth load only if both the coils connected thereto have predetermined potentials concurrently induced therein.

12. The combination of claim 11 including means associated with each core for limiting the potentials induced in the coils.

13. The combination of claim 12 in which the last-named means includes all the following: a coil for the core, a rectifier, a source of direct current potential, said coil, rectifier and source being connected in series with the source so that said rectifier is back-biased unless the potential induced in said coil exceeds the potential of said source.

14. In a half-adder first and second saturable cores, means for applying spaced pulses of magnetizing force to the cores which will drive them to saturation unless the cores are reverted during the spaces between pulses, first input means for the first core to revert the core during a space between pulses in response to a predetermined condition at the first input means, second input means for the second core to revert the core during a space between pulses in response to a predetermined condition at the second input means, three coils on each core, a sum output, means connecting the first coils on the cores in series with each other to give a resultant signal at the sum output when there is a flux change in the first core in the absence of a flux change in the second with the potentials of these coils cancelling each other when there is a flux change in both cores, means connecting the second coils on the cores in series with each other to give a resultant signal at the sum output when there is a flux change in the second core in the absence of a flux change in the first core, a carry output, and means connecting the third coils on the cores in series with each other and with the carry output and including bias means for cancelling the potential induced in the carry output circuit unless potential is induced in both of the coils of that circuit.

15. In a half-adder first and second saturable cores, means for applying spaced pulses of magnetizing force to the cores which will drive them to saturation unless the cores are reverted during the spaces between pulses, first input means for the first core to revert the core during a space between pulses in response to a predetermined condition at the first input means, second input means for the second core to revert the core during a space between pulses in response to a predetermined condition at the second input means, three coils on each core, a sum output, means connecting the first coils on the cores in series with each other to give a resultant signal at the sum output when there is a flux change in the first core in the absence of a flux change in the second with the potentials of these coils, cancelling each other when there is a flux change in both cores, means connecting the second coils on the cores in series with each other to give a resultant signal at the sum output when there is a flux change in the second core in the absence of a flux change in the first core, a carry output, means connecting the third coils on the cores in series with each other and with the carry output and including bias means for cancelling the potential induced in the carry output circuit unless potential is induced in both of the coils of that circuit, and means for limiting the potential induced in at least one of the coils on one of the cores.

16. In a half-adder first and second saturable cores, means for applying spaced pulses of magnetizing force to the cores which will drive them to saturation unless the cores are reverted during the spaces between pulses, first input means for the first core to revert the core during a space between pulses in response to a predetermined condition at the first input means, second input means for the second core to revert the core during a space between pulses in response to a predetermined condition at the second input means, three coils on each core, a sum output, means connecting the first coils on the cores in series with each other to give a resultant signal at the sum output when there is a flux change in the first core in the absence of a flux change in the second with the potentials of these coils cancelling each other when there is a flux change in both cores, means connecting the second coils on the cores in series with each other to give a resultant signal at the sum output when there is a flux change in the second core in the absence of a flux change in the first core, a carry output, means connecting the third coils on the cores in series with each other and with the carry output and including bias means for cancelling the potential induced in the carry output circuit unless potential is induced in both of the coils of that circuit, and means for limiting the potentials induced in said first and second coils on the two cores.

17. A half-adder as defined in claim 16 in which the last-named means includes all the following: a coil on one of the cores, a rectifier, a source of potential, and means connecting the coil, source and rectifier in series to limit the flux change in the core.

18. A half-adder as defined in claim 17 including rectifier means connecting the third coil on the other core in series with said bias means to limit the flux change in the second core.

19. A half-adder as defined in claim 16 in which the last-named means comprises a rectifier and a source of potential connected to the sum output to act as a limiter so that the circuit will tend to limit the rate of flux change in the first and second coils of either core when it is alone operating on an unsaturated portion of its hysteresis loop.

20. A half-adder as defined in claim 19 including a limiter connected to the carry output to limit the potential thereof to a predetermined maximum and thereby limit the rate of flux change in the cores when both are operating simultaneously on unsaturated portions of their hysteresis loops.

21. A gate for an electrical circuit comprising a load; a plurality of magnetic amplifiers, each of said amplifiers including a core characterized by a substantially rectangular hysteresis loop, a primary winding on each core, a secondary winding on each core; means for energizing said primary windings with pulses; said secondary windings being in a series circuit with the load and with each other and connected so that the potentials induced in said windings in response to said pulses are in additive relation to each other, a primary winding on each core; a control winding on each core; means for selectively energizing said control windings in the time between pulses to selectively condition said cores so that said secondary windings have potentials induced by the energization of said primary windings on those of said cores having previously energized control windings; a source of fixed bias potential and a rectifier in series circuit with each other and with said load, said bias potential and said rectifier being of such polarity and magnitude that potentials induced in a given plurality of said secondaries are needed to produce current through said rectifier and said load.

22. A gate as defined in claim 21 includes a means for limiting the potential across each one of said secondary windings.

23. A magnetic gating system comprising a plurality of magnetic cores each having a substantially rectangular hysteresis characteristic with positive and negative remanent states, a first winding linking each core for selectively magnetizing the core to the positive remanent state in response to input signals applied to said first winding during certain alternate time periods, a second winding linking each core, a source of periodic power pulses coupled to said second windings for concurrently magnetizing the cores to the negative remanent state during time periods intermediate said certain periods of said input signals, a third winding linking each core for producing a potential in response to a change in the magnetization of the core from one remanent state to another, means for connecting said third windings in series, a unilateral conducting element interposed in series with said third windings and poled to pass currents induced by said periodic power pulses, a potential source connected in series with said series connected third windings and said unilateral conducting element for providing a fixed bias potential of magnitude and polarity to prevent current flow through said unilateral conducting element unless said series connected third windings produce a total potential greater than the bias potential in response to a predetermined plurality of said cores having been magnetized to the positive remanent state by input signals prior to the energization of said second windings by said power pulses, and potential limiting means for establishing a maximum potential which can be produced across one of said third windings.

24. A magnetic gating system comprising a plurality of magnetic cores each being substantially saturated at positive and negative remanence, a signal winding linking each of said cores for magnetizing the corresponding core to positive remanence in response to a signal input, a power winding linking each of said cores, a source of power pulses coupled to said power windings for concurrently magnetizing said cores to negative remanence during a period following the application of said signal inputs, an output winding on each core for developing a potential therein in response to the application of said power pulses to said power windings on those of said cores previously magnetized to positive remanence, a load, means coupling said output winding in series with each other and said load in polarity to provide additive relationship between the potentials of all said output windings in response to said power pulses, a first rectifier means interposed between adjacent output windings and poled to permit current flow only in response to potentials produced in those of said output windings linking cores previously magnetized to positive remanence by input signals to corresponding signal windings, a fixed potential bias interposed in series with said output windings, said first rectifier means and said load during said power pulses for preventing current flow in said load except upon the concurrent development of potentials in a predetermined plurality of said load windings in response to said power pulses, potential limiting means including a second rectifier means each shunting selected output windings for limiting the maximum potential developed by the corresponding output windings.

25. In an electrical circuit; a plurality of sources of signal pulses; and means responsive to signal pulses from said sources to produce an output only in response to signal pulses from at least a predetermined plurality of said sources, said responsive means comprising a core for each of said sources, winding means linking each of said cores to selectively alter the magnetization of each of said cores in response to a signal from a corresponding source, potential developing means including a second winding on each of said cores responsive to the magnetization of said cores by said winding means for developing therein potentials of predetermined magnitude, means including both a load and a source of bias for producing current flow through said load when the potential developed by said potential developing means exceeds the potential of said source of bias, rectifier means for limiting current flow in said second windings to a single direction, and limiting means including a source of potential in circuit with said second windings for limiting the individual effect of each of said second winding upon the development of the potential of said potential developing means.

26. A gate for an electrical circuit comprising a source of pulses, a plurality of magnetic amplifiers, each of said amplifiers having a core characterized by a substantially rectangular hysteresis loop, a power winding linking each of said cores, the power windings being connected in parallel with each other, a source of spaced power pulses tending to pass current through the parallel connected power windings, a load in series with said source and said parallel power windings, means for biasing the load so that it is energized by said pulses only when at least a predetermined current flows through said parallel power windings, said last-named means including a source of potential, an impedance, and a diode connected in series circuit, said series circuit being connected to said parallel connected power windings at a point between said diode and said impedance, said bias potential and said diode being poled to maintain said intermediate point at a fixed potential in the absence of at least a predetermined current flow through said parallel power windings, a control winding on each core, and means for selectively energizing the control windings during the space between said power pulses to thereby condition the cores to selectively allow current flow through each of said parallel power windings from said sources of power in dependence upon the energization of the corresponding one of said control windings, an impedance in each of the parallel circuits including said power windings, said impedances being of magnitude to allow current flow in each of said parallel power windings such that only the sum of the currents through a predetermined plurality of said parallel power windings exceeds the said predetermined current flow and thereby supplies energy to said load, and potential limiting means including a source of potential coupled to said parallel connected power windings in manner to limit the current through each of said impedances to a predetermined value.

27. A logic circuit comprising a plurality of current paths, each of said paths separately including a signal-responsive switching means for substantially cutting off current flow and for permitting current flow of a certain magnitude in response to different input signals, a load, a current responsive circuit providing a low impedance path to currents less than that supplied by a certain plurality of said paths and a high impedance to currents supplied by said certain plurality of said paths, means connecting said paths in a first parallel combination, means connecting said load and said current responsive circuit in a second parallel combination, and means connecting said parallel combinations in series and for applying an operating potential across said series-connected parallel combinations, whereby said load is substantially energized by current through said paths only when said switching means permits current flow from said certain plurality of said paths.

28. A logic circuit as recited in claim 27 wherein said current responsive circuit includes a unilateral conductor, an impedance, and a potential source connected in a series circuit, the potential of said potential source being such as to bias said unilateral conductor in a forward direction to present a low impedance to currents less than that supplied by said certain plurality of said paths and to present a high impedance to current supplied by said certain plurality of said paths, the junction of said unilateral conductor and said impedance being connected to a terminal of said load and to terminals of said current paths.

29. A logic circuit as recited in claim 27 including means connected to each of said paths for limiting the current supplied through each of said paths to a certain magnitude.

30. A logic circuit comprising a plurality of current paths, each of said current paths separately including an impedance and a switching means for substantially cutting off current flow therethrough in response to an input signal of one magnitude and permitting current flow in response to an input signal of another magnitude, a load, a source connected to said current paths tending to produce predetermined currents in said current paths, means connecting said current paths in parallel with each other and in series with said load, and a circuit in parallel with said load and responsive to the total of said currents through said paths to present a low impedance across said load to total currents through said paths substantially below a certain magnitude corresponding to currents through a plurality of said paths and to present a high impedance to total currents through said paths above said certain magnitude.

31. A logic circuit as recited in claim 30 wherein said switching means includes a magnetic core having a substantially rectangular hysteresis loop, a primary winding and a secondary winding on said core, said primary winding being linked to said core to set said core in a first remanent state in response to an input signal of said other magnitude, means connecting said secondary winding in the corresponding one of said current paths, said secondary winding linking said core so that said secondary winding has a minimum impedance to current flow from said source when said core is set in said first remanent state.

32. A logic circuit as recited in claim 31 including means connected to each of said paths for limiting the magnitude of current therein.

33. A logic circuit comprising a plurality of sources of signals, a load, separate impedances each connected in an individual series circuit between a terminal of a different one of said sources and a first terminal of said load for producing a predetermined current in each of said series circuits in response to signals from corresponding sources, means connecting a second terminal of said load to another terminal of each of said sources of signals, a circuit connected in parallel with said load, said parallel circuit including an impedance and a potential source in series with said last-named impedance, said potential source being poled to produce a current flow through said last-named impedance in a direction corresponding to the direction of current produced by said sources in said last-named impedance and of magnitude substantially equal to the total of said current produced in a certain number of said series circuits, and a unilateral conductor connected in parallel with said load and poled to present a high impedance to said predetermined current and a low impedance to current produced by said potential source whereby said parallel circuit effectively forms a low impedance across said load for the total of said predetermined current in said certain number of said series circuits and forms a high impedance across said load for current in said series circuits in excess of said total.

34. A logic circuit comprising a potential source, a load, a plurality of parallel current paths connected between said potential source and said load, said current paths each including an impedance and a signal responsive switching means in series with said impedance for effectively completing and interrupting said current paths selectively in response to corresponding signals of first and second values, said potential source and said path impedances being of magnitude to produce a certain total current through a certain plurality of said current paths in response to completion of said certain plurality of said current paths by said switching means, and a current responsive circuit connected in parallel to said load, said current responsive circuit having a low effective impedance for said certain total current in said paths and a high effective impedance for a total current in said paths greater than said certain total current.

References Cited in the file of this patent

UNITED STATES PATENTS

| | | |
|---|---|---|
| 2,591,406 | Carter | Apr. 1, 1952 |
| 2,666,151 | Rajchman et al. | Jan. 12, 1954 |
| 2,685,644 | Toulon | Aug. 3, 1954 |
| 2,695,993 | Haynes | Nov. 30, 1954 |
| 2,696,347 | Lo | Dec. 7, 1954 |
| 2,741,757 | Devol et al. | Apr. 10, 1956 |
| 2,741,758 | Cray | Apr. 10, 1956 |
| 2,776,380 | Andrews | Jan. 1, 1957 |
| 2,806,648 | Rutledge | Sept. 17, 1957 |

OTHER REFERENCES

Olsen: "A Magnetic-Matrix Switch and Its Incorporation Into a Coincident-Current Memory," M. I. T. Master of Science Thesis, June 6, 1952.

Newhouse: "A Review of Magnetic and Ferro-Electric Computing Components," Electronic Engineering, May 1954, pp. 192–199.

Brean: "Magnetic Matrix Switch Reads Binary Output," Electronics, May 1954, pp. 157–159.